United States Patent

Osborne

[15] 3,658,596

[45] Apr. 25, 1972

[54] FLEXIBLE SOLAR CELL MODULAR ASSEMBLY

[72] Inventor: Bodwell D. Osborne, Atherton, Calif.

[73] Assignee: Lockheed Missiles & Space Company, Sunnyvale, Calif.

[22] Filed: Sept. 21, 1970

[21] Appl. No.: 73,819

[52] U.S. Cl. ....................................................136/89, 29/572

[51] Int. Cl. ..........................................................H01l 15/02

[58] Field of Search.......................................136/89; 29/572

[56] References Cited

UNITED STATES PATENTS

| | | | |
|---|---|---|---|
| 3,121,648 | 2/1964 | Jensen | 136/89 |
| 3,375,136 | 3/1968 | Biggar | 136/89 X |
| 3,376,164 | 4/1968 | Bachwansky | 136/89 |
| 3,562,020 | 2/1971 | Blevins | 136/89 |
| 3,571,915 | 3/1971 | Sherland | 136/89 X |

*Primary Examiner*—Allen B. Curtis

*Attorney*—Harry A. Herbert, Jr. and Henry S. Miller, Jr.

[57] ABSTRACT

A module for a solar cell panel with silicon photovoltaic cells fused between two sheets of FEP Teflon. The plastic is mounted on an aluminum frame with two side members adapted to interlock with similar modules. The side frame members also act as current carrying bass members.

2 Claims, 2 Drawing Figures

INVENTOR
BODWELL D. OSBORNE
BY Harry A. Herbert Jr. and
Henry S. Miller Jr.
ATTORNEYS

FLEXIBLE SOLAR CELL MODULAR ASSEMBLY

BACKGROUND OF THE INVENTION

This invention relates generally electrical power generation and more particularly to a flexible lightweight solar cell assembly particularly adapted for use on satellites and other interplanetary space probes.

The most important consideration in space vehicles after reliability is weight. In the field of solar-electrical converters, known devices consist of a sturdy, rigid platform of relatively heavy construction to prevent damage to the individual cells. These cells in turn have heavy metal substrates and are adhesively attached to the supports. The cells have a fused silica (glass like) cover bonded to the top of the solar cell with a specially formulated optical adhesive. The silica is thin and quite fragile and easily damaged if struck by an alien object or if bent or twisted along any one of its axis.

These known solar cells are not only heavy and have limited reliability they are difficult to manufacture and require considerable time to assemble as the adhesives set.

The cost of solar generated electricity is on the verge of being prohibitative, with the present cells producing approximately 10 to 15 watts per pound resulting in a cost as high as one million dollars per kilowatt.

A need has been found then for a lightweight, flexible and inexpensive means of producing electrical current in space vehicles.

SUMMARY OF THE INVENTION

The invention consists of a plurality of solar cells attached at some point to a current collecting strap or buss. The cells are sandwiched between two sheets of a transparent thermoplastic and suspended from lightweight supporting frames utilizing the tension capabilities of the plastic to secure them in relative position and further protect the cells from radiational damage.

This invention involves a solar module constructed in a way that it may be easily interconnected with other similar modules and form a panel of sufficient size to produce the power required for a particular function.

It is therefore an object of this invention to provide a new and improved flexible solar cell modular assembly.

It is another object of this invention to provide a new and improved solar cell modular assembly that will produce more electrical power per weight than any presently available.

It is a further object of the invention to provide a new and improved solar cell assembly that is relatively simple to assemble.

It is still another object of the invention to provide a new and improved solar cell assembly that will mate with similar assemblies to provide a required power.

It is still a further object of the invention to provide a solar cell assembly that is flexible and will resist shock and vibration and the damage caused thereby.

These and other advantages, features and objects of the invention will become more apparent from the following description taken in connection with the illustrative embodiments in the accompanying drawings.

DESCRIPTION OF THE PREFERRED EMBODIMENTS

Figure 1:
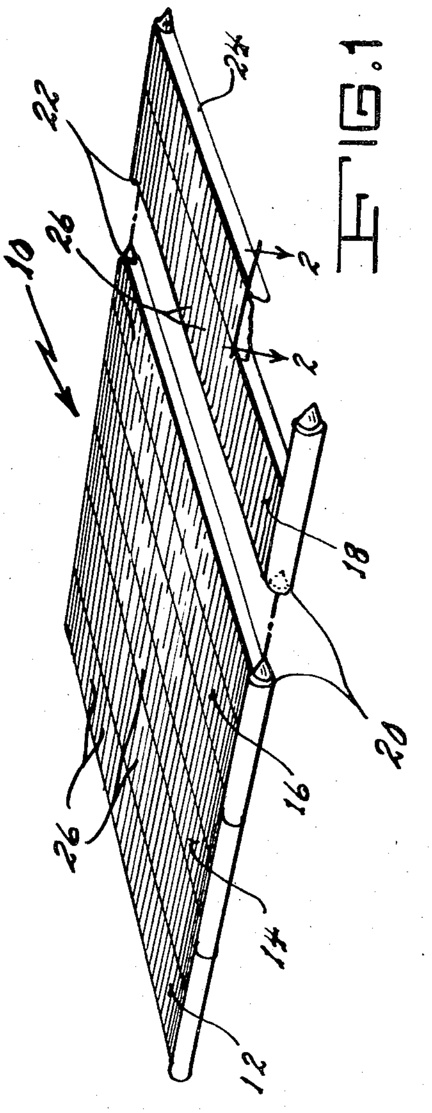
FIG. 1 is a partly exploded view of a solar module array.

Referring now to FIG. 1 a solar modular panel assembly is shown generally at 10 and consisting of modules 12, 14, 16 and 18. The modules 12, 14 and 16 are interconnected by interlocking frame members on either side shown by the numerals 20 and 22. The longitudinal sides of each module are bounded by an aluminum compression strut 24 and 26.

Suspended between the interlocking side frame members, which also act as electrical conductors, and the compression struts is an array of individual solar cells. These cells are directly connected to the frame members only by electrical collecting straps.

Figure 2:
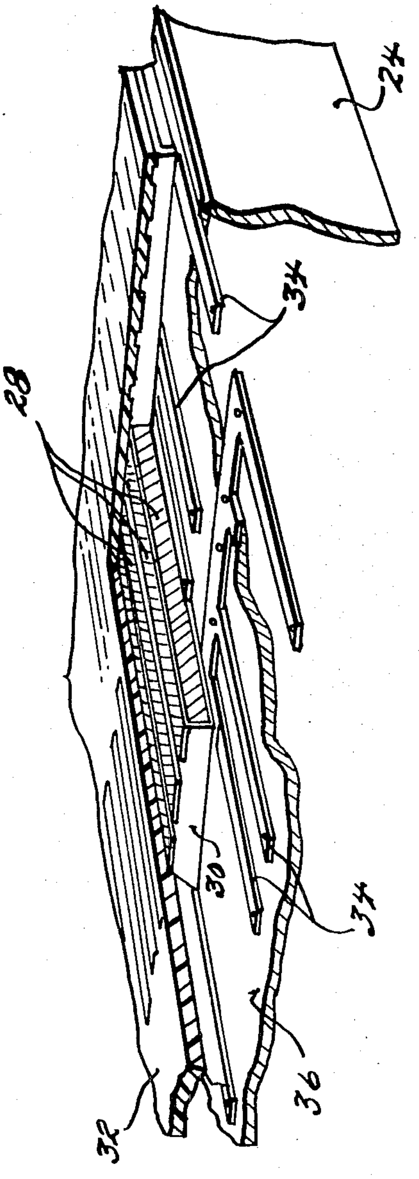
FIG. 2 is a sectional view of a solar module taken along lines 2—2 of FIG. 1.

FIG. 2 concerns a section of FIG. 1 taken along the line 2—2. Solar cells 28 are mounted on a substrate 30 which contain negative grids and collectors. A clear Teflon sheet is placed across the entire array of solar cells and secured to the side frames (20,22) and end struts (24,26).

Next to the solar cells are collecting straps 34 which are the positive collectors and extend in operation to the side frame members to complete the electrical circuit.

Positioned on the bottom of the array in the figure is a second sheet of Teflon 36 that is attached to the supporting frame in the same manner as the top sheet 32.

In assembling the module the solar cells 28 and substrate 30 are placed on top of the collector straps 34 in a geometrical configuration such that their ultimate output will be commensurate with the system electrical requirements, and the entire arrangement is sandwiched between two sheets of FEP Teflon.

The complete assembly is placed in an oven and fused together as one integrated system that is called a module and it would become one of a multimodular system for a large area, lightweight, flexible solar array.

I claim:

1. A means for converting solar energy into electrical energy comprising: a plurality of photovoltaic solar cells justaposed in sets; collecter strips connected orthogonally to the sets of solar cells; first and second thermoplastic transparent sheets located on opposite sides of the solar cells and fused thereto; a frame having a pair of end struts and a pair of side frame members wherein said side frame members have connected thereto the said collector strips and said frame has said first and second plastic sheets suspended therefrom.

2. A method for making a flexible solar cell module assembly comprising the steps of: placing solar cell sets on electrical collector straps in a configuration that will provide a required output; sandwich the cells and straps between two sheets of thermally sensitive plastic; heat the package until the plastic sheets are fused to the cells and to each other; and suspend the finished envelope from a frame adapted for electrical and mechanical interconnection with other frames.

* * * * *